Nov. 20, 1962     T. A. ROGERS     3,064,988
TRUCK BODY SUPPORT
Filed Aug. 9, 1960     4 Sheets-Sheet 1
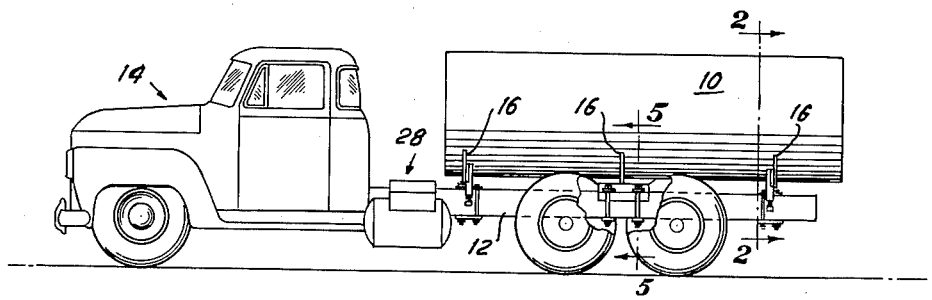
Fig. 1
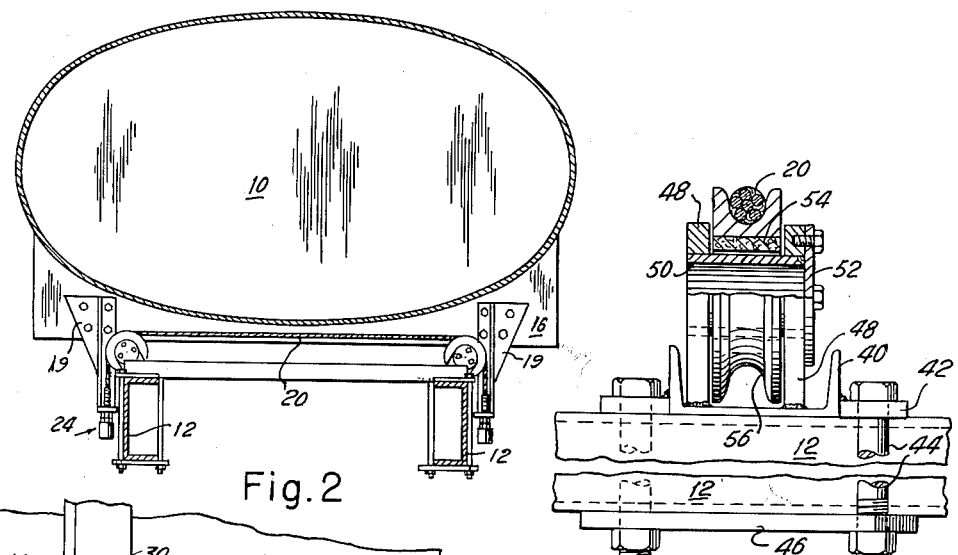
Fig. 2
Fig. 4
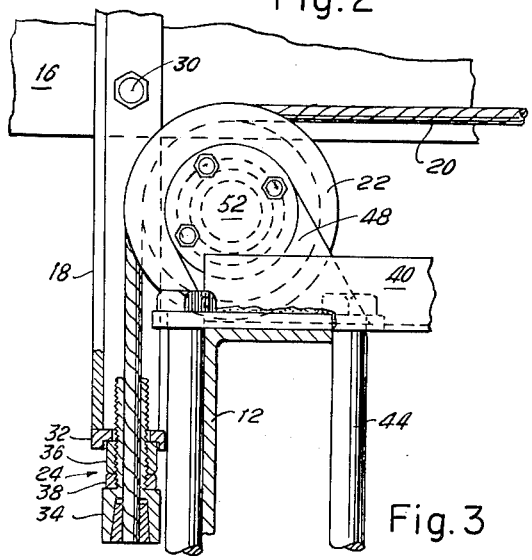
Fig. 3
INVENTOR
Thelmer A. Rogers
BY
ATTORNEY Nov. 20, 1962 T. A. ROGERS 3,064,988
TRUCK BODY SUPPORT
Filed Aug. 9, 1960 4 Sheets-Sheet 2

INVENTOR
Thelmer A. Rogers

BY *C. W. Maffee*

ATTORNEY

Nov. 20, 1962 T. A. ROGERS 3,064,988
TRUCK BODY SUPPORT
Filed Aug. 9, 1960 4 Sheets-Sheet 4

INVENTOR.
Thelmer A. Rogers
BY
Atty.

3,064,988
TRUCK BODY SUPPORT
Thelmer A. Rogers, Lubbock Machine & Supply,
P.O. Drawer 1589, Lubbock, Tex.
Filed Aug. 9, 1960, Ser. No. 48,506
21 Claims. (Cl. 280—5)

This invention pertains to supports for truck bodies. This application is a continuation-in-part of my application Serial No. 756,232, filed August 20, 1958, now abandoned.

A problem exists in the mounting of a body to the frame of a truck. This is so because ordinarily the frame of the truck has a certain amount of flexibility. It twists and bends somewhat when the truck goes over rough terrain. It tends to buckle so as to form an arc about diagonals. However, the body of the truck is essentially rigid. This situation is handled in two ways. One is to mount the body to the truck by yielding connectors so that the frame is free to twist and bend and the body remains rigid. The other method is to attach the rigid body rigidly to the frame so that the frame can no longer twist and bend. This results in excessive strain upon the frame between the truck body and the cab of the truck which also essentially is rigid.

I have invented a yielding coupling to attach the body to the frame. One embodiment comprises perches depending from the body, a cable attached to the perches which are free to move relative to the frame. The cable rides on rollers attached to the frame. This invention results in the following advantages:

No transmission of the twist of the frame to the body.
Ease in changing the body from one truck to another.
Ease in levelling the body upon the frame.
Adjusting the loading of the body either toward the ends of the frame or to the center.

An object of this invention is to provide a mounting for a body upon a truck with the above features.

Other objects are to achieve the above with a device that is sturdy, compact, simple, and reliable; yet inexpensive and easy to manufacture.

The specific nature of the invention as well as other objects, uses and advantages thereof will clearly appear from the following description and the accompanying drawings in which:

FIG. 1 is a side elevation of a truck with a body connected according to this invention.

FIG. 2 is a cross section of the body and frame taken on line 2—2 of FIG. 1.

FIG. 3 is a detail of one of the end supports, a fragment taken from FIG. 2.

FIG. 4 is a side view of the support shown in FIG. 3, partially in section.

Figure 5:
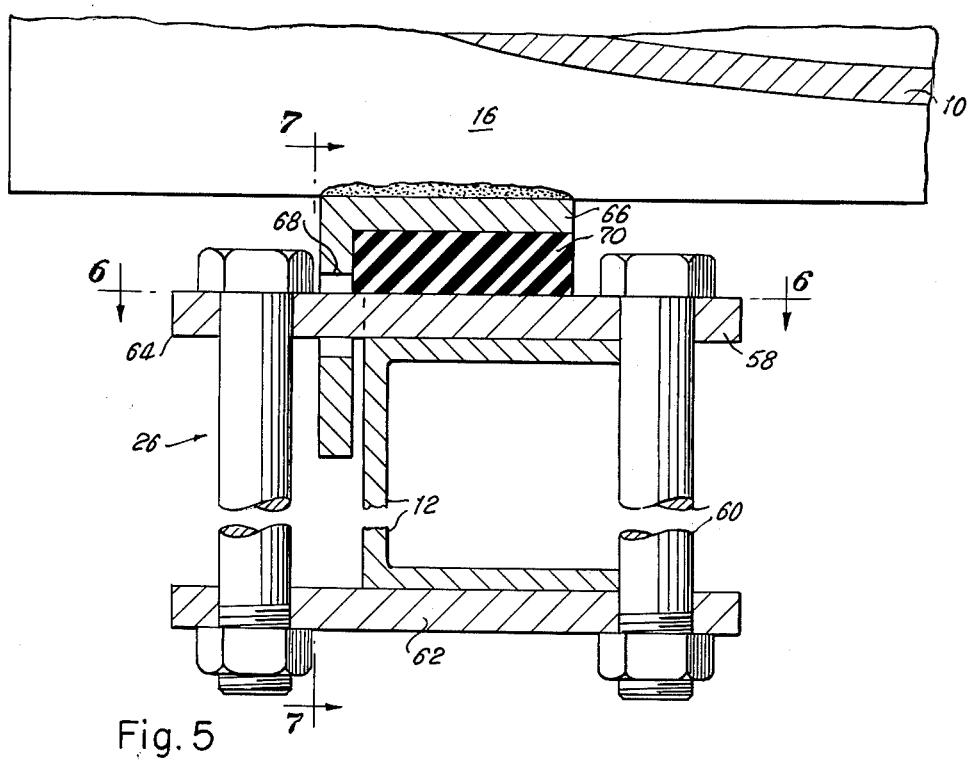
FIG. 5 is a cross section of a part of the frame taken on line 5—5 of FIG. 1.

One embodiment of this invention as seen in the accompanying drawings is concerned with mounting a cargo tank upon the frame of truck.

It will be understood that when the term "body" is used, it is used in a broad sense indicating any body which might be mounted on the truck frame, for example, a tank or other cargo body or the cab of the truck or the engine or any other rigid body which might be mounted on the frame of the truck.

FIG. 1 shows the body represented by a tank 10 which is mounted upon a conventional truck with tandem wheels and a frame 12, also shown is the cab 14.

The tank itself is supported by three cradles 16. Perches 18 depend from the outside cradle 16 on either side. These perches or members depend vertically from the cradle and are adjacent to the outside edges of the frame 12 with some clearance. They may be stiffened by gussets 19 as shown in FIG. 2. Cable 20 is securely attached to the lower end of the perches and extends over rollers or members 22. It is understood that instead of a cable, a chain or any other flexible tension member could be used. I prefer a cable as it has more elasticity and provides more cushioning effect between the tank and frame. The cable is attached to the bottom of the perch by an adjustable means 24.

The center cradle is attached to the frame by more rigid connection 26. This is possible because approximately directly above the rear ground engaging wheels, the frame has very little twist or flexibility. Therefore, at this point it is possible more or less to rigidly attach the body to the frame.

When the truck passes over rough terrain, causing the frame to twist, if one side of the rear end of the frame twists upward, this causes the roller 22 at that side to move upward. However, the other side of the frame will twist in a downward motion allowing the roller there to move downward. This combination of movement is accommodated by the cable 20. Therefore, the body remains perfectly rigid, allowing the frame to twist and bend.

If it is desired to move the body to another truck, all that is necessary is to remove the center connection and hoist the body from one truck and set it down on another truck which is provided with similar rollers. If the tank does not set level, i.e. if the front end is higher than the after end, all that is necessary is to loosen the adjustable connections at the front cable and tighten the adjustable connections at the rear cable. If it is desirable to place more of the load at the center connection, all that is necessary is to loosen both of adjustable connections 24.

As stated before, the connection allows the frame to twist throughout its length. If the body were attached rigidly to the frame, all of the twisting and motion of the frame would have to occur in the area 28 shown in FIG. 1. Since this short span would have to accommoderate all the twisting of the frame, it soon fatigues and fails.

More particularly describing the specific construction of the connections, I contemplate attaching the perches 18 to the cradle 16 by the use of bolts 30, the perches being outside the rollers. The perch itself is an angle iron with a square plate 32 at its lower end. The plate has an aperture vertically there through. The plate is welded to the perches. A cup 34 has a hollow externally threaded stem attached to it. The threaded stem extends through the aperture in the plate 32. The cable 20 extends through the bore of the hollow stem and on down into the depending cup. The cable is secured within the cup by any conventional means such as are well known to the art. Nut 36 and associated jam nut 38 are threaded onto the hollow stem immediately below the plate. Therefore, if it is desirable to adjust the tension in the cable, all that is necessary is to back off on the jam nut and change the position of the nut 36.

The truck frame itself has a channel 40 attached transversely thereof. The channel has ears 42 with apertures through which pass bolts 44. The bolts pass through holes in straps 46 thereby securely attaching the channel to the frame. The structure on each end of the channel is the same and, therefore, one such structure will be described. Welded within the channel are two upright plates 48 lying in a plane transverse to the vehicle frame. The plates have circular openings therein through which passes axle tube 50. The axle tube is welded to an end plate 52 which in turn is attached by means of studs to one of the upright plates 48. Roller 22 is journalled upon the axle between the upright plates. A fiber bushing is used so that the roller is free to turn on the axle tube. The roller has annular groove or bearing surface 56 along its periphery so that the cable fits snugly in place, bearing in the groove. Each roller is adjacent a perch.

Figures 6, 7:
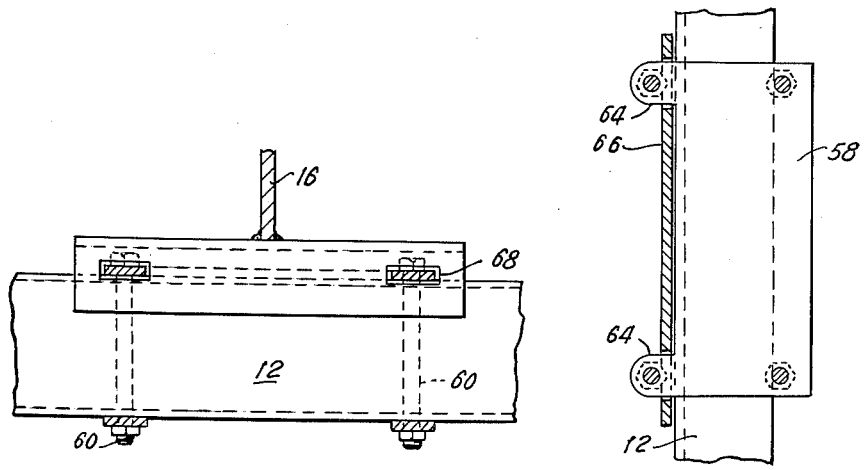
FIG. 6 is a sectional view taken on line 6—6 of FIG. 5.
FIG. 7 is a sectional view taken on line 7—7 of FIG. 5.

The center connection has plate 58 (FIG. 6) which is attached by four bolts 60 to the frame 12. The bolts attach on either side of the frame to lower strap 62. The plate is basically rectangular except at two corners there are projecting ears 64 which have apertures through which pass the bolts. Angle iron 66 is securely welded to the center cradle 16. The angle lies in a general horizontal plane as does plate 58. The angle has a vertical depending leg which has two rectangular openings 68 therein. The ears 64 protrude through these openings. The openings are larger in every dimension than the ears so that there is a certain amount of freedom of movement between the plate 58 and the angle 66. Rubber block 70 is positioned between the horizontal leg plate of the angle 66 and the horizontal plate 58. In this way the center connection has a comparatively rather small amount of freedom and flexibility. Perhaps more important, the center plate does not allow for any shifting forward and aft nor does it allow for much vertical movement of the body relative to the frame.

Various modifications will readily suggest themselves. For example, the rubber block mounting could be moved back and only a single cable connection used. Or the members could be reversed so that the perches extended upward from the frame and the rollers depended from the body. Or the members and cables could all lie in a vertical plane extending longitudinally the frame rather than transversely as shown. Or this mounting could be used on a trailer rather than the single unit truck shown.

Figure 8:
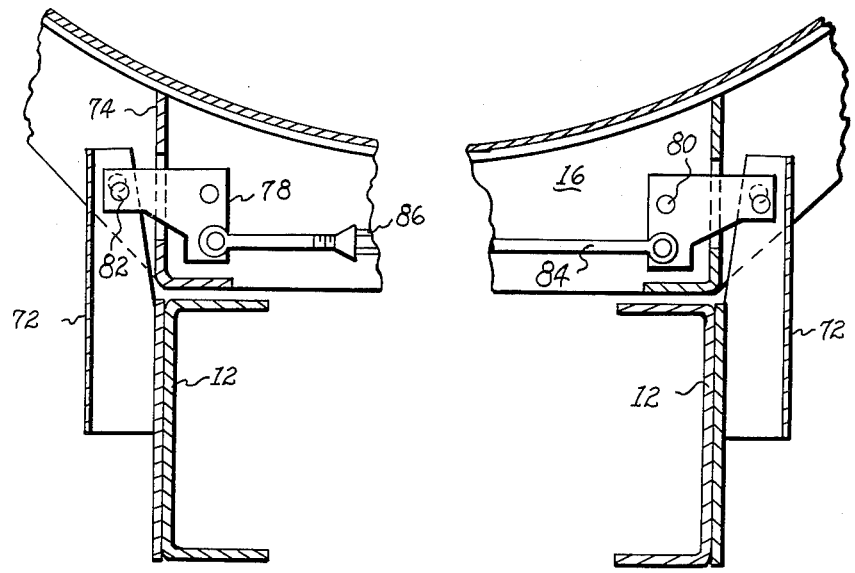
FIG. 8 is a cross sectional view of another embodiment of this invention, a similar view as FIG. 2.
Figure 9:
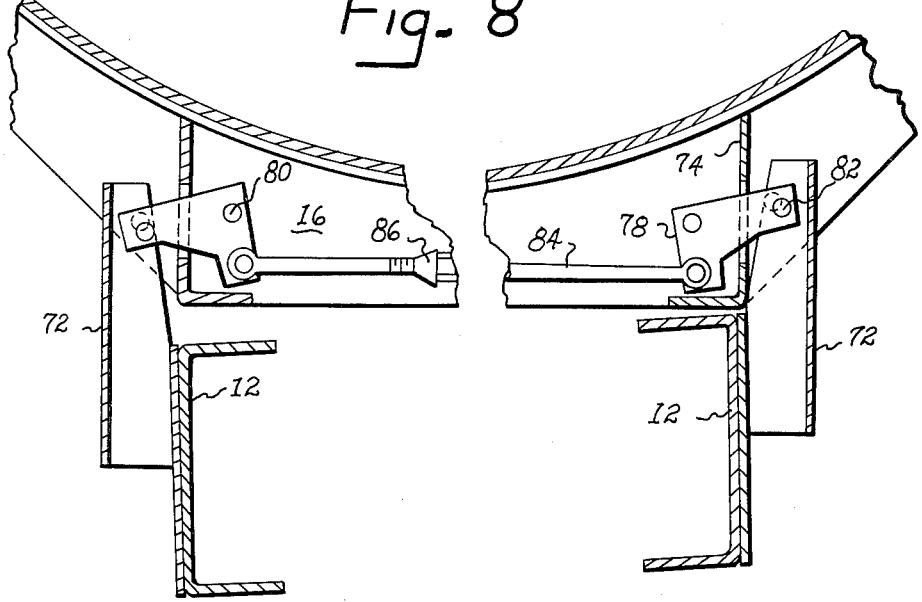
FIG. 9 is a similar view to FIG. 8 showing the frame twisted.
Figure 10:
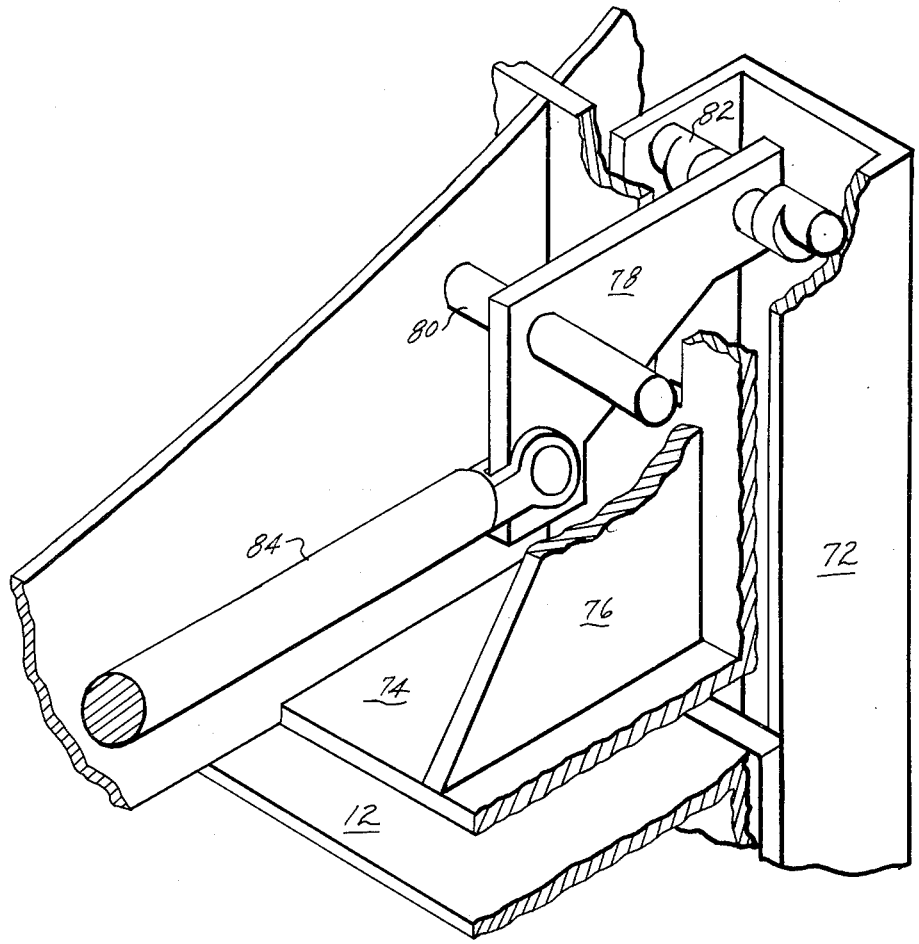
FIG. 10 is a perspective view of the embodiment of FIG. 8 partially broken away.

An example of the modifications which may be made is shown by the second embodiment illustrated in FIGS. 8, 9, and 10. In this embodiment bell cranks are used as a connection between the tank and body rather than using a portion of the cable as the connector as in the previous embodiment.

Support pedestal or member 72 is welded or otherwise securely attached to the outside frame members 12. The pedestal is a channel member having the two flanges transverse of the frame. Tank stringer 74 extends parallel to the tank axis. Pivot support 76 is attached to the stringer parallel to the cradle 16. The pivot support is a plate of steel welded to the stringer. Bell crank 78 is used as the connection between the frame member 72 and the tank member. In this case the tank member is a composite unit including both the cradle and the pivot support, one end of pivot pin 80 passing through a hole in the cradle and the other end through a hole in the pivot support. The bell crank is pivoted to the pedestal by eccentric shaft 82. The other point on the bell crank is pivoted to rod 84. The rod is adjustable in length by turnbuckle 86.

In operation as the frame twists (FIG. 9) the bell crank will rotate so as to permit one frame member to come closer to the tank and the other frame members move away. Thus, the rod will cause the bell cranks to move in the opposite direction. The eccentric shaft 82 is necessary because as the frame twists, there will be slight difference between the center of this pivot and the pivot to the tank.

Although the connection 78 has been described as a bell crank it will be evident that it could be any sort of a rigid block which is pivoted to a frame member, pivoted to a tank member and connected to a tension member, the tension member being connected at a point not in line with other two pivots. If the rod is connected below a connecting line of the other two pivots it will be in tension. If it were connected above the two pivots it normally would be in compression. I prefer to have it normally in tension so that it will not tend to buckle under normal loads.

An advantage of the embodiment illustrated in FIGS. 8, 9, and 10 is that the rod acts as a compression member to prevent upward movement of the body away from the frame. Therefore, a rubber block connection could be used at all points except adjacent to the cab where the short span twisting results in over-stressing of the frame as discussed above. The turnbuckle may be used to adjust the load as was described in the first embodiment.

Another modification which has not been illustrated would be somewhat similar to the second embodiment wherein a bell crank would be used. However, the bell crank could result in a turning moment upon a connecting element connecting the bell cranks on either side. Therefore, instead of having a tension member connecting the bell cranks, a torsion member would connect the bell cranks.

It will be apparent that the embodiment shown is only exemplary and that various modifications can be made in constructions, materials, and arrangement within the scope of the invention as defined in the appended claims.

I claim as my invention:

1. In a vehicle having a plurality of ground engaging wheels, a frame connecting said wheels, and a body; the improved means for mounting said body on said frame comprising: a pair of members attached to said frame; a second pair of members attached to said body; said four members lying within a vertical plane; one pair of members being outside of said other pair of members; a flexible tension element securely attached to said outside members; said other pair of members having bearing surfaces thereon; said flexible tension element bearing on said surfaces; and means for reducing friction between said flexible tension element and said other pair of members.

2. The invention as defined in claim 1 wherein each of said members is adjacent a member of the other pair.

3. The invention as defined in claim 1 wherein said flexible tension element is adjustably attached to said outside members.

4. The invention as defined in claim 1 wherein said vertical plane is transverse to the frame.

5. The invention as defined in claim 1 in combination with a second mounting, which second mounting includes a horizontal plate attached to the frame, a horizontal plate attached to the body, and a block of rubber between the plates.

6. The invention as defined in claim 5 wherein said block of rubber is located approximately over some of said wheels of said frame.

7. In a vehicle having a plurality of ground engaging wheels, a frame connecting said wheels, and a body; the improved means for mounting said body on said frame comprising: perches depending from said body, the perches adjacent the outside edge of said frame, rollers mounted for rotation on said frame, each roller adjacent a perch, and a flexible tension member, each end of the tension member attached to one of the perches below the rollers, the tension member extending over the rollers, the perches and rollers lying in a vertcal plane transverse of said vehicle; so that any twisting or buckling of said frame is isolated from said body.

8. The invention as defined in claim 7 in combination with a second mounting, said second mounting including a horizontal plate attached to the body, a horizontal plate attached to the frame, and a block of rubber between the plates.

9. The invention as defined in claim 8 with the addition of a third mounting including perches, rollers, and a flexible tension member connected to the frame and body as hereinabove stated; said second mounting located intermediate said first-mention mounting and said third mounting; and said block of rubber located approximately now over some of said wheels of said frame.

10. In a vehicle having a plurality of ground engaging wheels, a frame connecting said wheels, and a cargo tank; the improved means for mounting said tank on said frame comprising: three cradles attached to said tank, the cradles transverse to said vehicle and said tank; the center cradle having a horizontal plate attached thereto, a second horizontal plate attached to said frame directly under the cradle plate and approximately over some of said ground engaging wheels, a block of rubber between the plates contacting both; each outside cradle having a mounting including: a perch depending vertically from each side of the cradle, each perch adjacent to an outside edge of the frame, rollers rotatably mounted on the frame adjacent the cradle and perches, the rollers lying in a vertical plane with the perches on that cradle; and a flexible tension member attached to each perch below the roller, extending over the adjacent roller, extending over the other roller adjacent that cradle, and attached to the adjacent perch below the other roller so that the frame is free to twist and buckle relative to the tank.

11. The invention as defined in claim 10 wherein each of said flexible tension members is attached to each of said perches as follows: said perch having a plate with an aperture therein, a cup with a hollow externally threaded stem, the stem extending through the aperture, said flexible tension member extending through the hollow stem and secured in the cup, and a nut threaded on the hollow stem bearing against the plate on the perch, so that the flexible tension member may be adjusted relative to the perch.

12. The invention as defined in claim 10 wherein each roller is attached to the frame as follows: said frame having attached thereto two upright plates lying in a plane transverse to said frame, the plates having aligned circular openings, a tube through openings, an end plate welded to the tube and bolted to one of the upright plates, a roller journalled on the tube between the upright plates, said roller having an annular groove into which said flexible tension member lays, and a fiber bushing between the roller and tube.

13. In a vehicle having a plurality of ground engaging wheels, a frame connecting the wheels, and a body; the improved means for mounting the body on the frame comprising: a frame member on each side of the frame, a body member on each side of the body, all said members lying in a common plane, a connection between the body member and the frame member on each side, each connection permitting vertical movement between the body member and frame member, and an element connecting the connections, the element being means for causing relative movement of one connection to result in equal and opposite vertical relative movement of the other connection.

14. In a vehicle having a plurality of ground engaging wheels, a frame connecting the wheels, and a body; the improved means for mounting the body on the frame comprising: a frame member on each side of the frame, a body member on each side of the body, all said members lying in a common plane, a connection between the body member and frame member on each side, each connection permitting vertical movement between the body member and frame member, an element connecting the connections, the element being means for causing relative movement of one connection to result in opposite relative movement of the other connection, and wherein the connection between the members is a portion of a cable attached to the body members and extending over the frame members, and the element connecting the connections is a portion of the same cable.

15. The invention as defined in claim 13 wherein the connection between the members is a rigid block pivoted to the frame member, to the body member and to the element.

16. In a vehicle having a plurality of ground engaging wheels, a frame connecting the wheels, and a body; the improved means for mounting the body on the frame comprising: a frame member on each side of the frame, a body member on each side of the body, all said members lying in a common plane, a rigid block on each side, each block pivoted to one of the frame members, each block pivoted to one of the body members and a rod connected to both of said blocks.

17. The invention as defined in claim 16 wherein one of the pivoted connections of the rigid block to one of the members is an eccentric shaft.

18. The invention as defined in claim 16 wherein the rod has an adjustment therein whereby the length may be adjusted.

19. The invention as defined in claim 16 wherein the rod is connected to the block at a point below the points pivoted to the frame member and body member.

20. A vehicle comprising:
a plurality of ground engaging wheels,
a frame interconnecting all the ground engaging wheels,
a body,
a frame member attached on each side of the frame,
a body member attached on each side of the body,
all members lying in a common plane,
a connection between the body member and the frame member on each side,
each connection permitting vertical movement between the body member and frame member,
and an element connecting the connections,
the element being means for causing relative vertical movement of one connection to result in equal and opposite vertical movement of the other connection.

21. A vehicle comprising:
a plurality of ground engaging wheels,
a frame interconnecting all the ground engaging wheels,
the frame including a longitudinal element on each side of the frame,
a body,
a first cradle and at least one second cradle attached to the body,
the first cradle attached to the longitudinal element of the frame on each side of the frame,
the frame including at least one transverse element connected between the longitudinal elements at a position remote from the first cradle,
a frame member attached on each side of the frame,
a body member attached on each side of the second cradle,
all said members lying in a common plane,
a connection between the body member and the frame member on each side,
each connection permitting vertical movement between the body member and frame member,
and an element connecting the connections,
the element connecting the connections being means for causing relative vertical movement at one connection to result in equal and opposite vertical movement of the other connection.

References Cited in the file of this patent
UNITED STATES PATENTS

| | | |
|---|---|---|
| 1,455,466 | Wickersham | May 15, 1923 |
| 1,578,152 | Masury et al. | Mar. 23, 1926 |
| 2,694,581 | Helmle | Nov. 16, 1954 |
| 2,706,453 | Schneider | Apr. 19, 1955 |